United States Patent [19]

Klebe et al.

[11] 4,118,466
[45] Oct. 3, 1978

[54] PROCESS FOR THE PRODUCTION OF COMPACT, COARSE SODIUM PERCARBONATE

[75] Inventors: Hans Klebe, Rheinfelden; Gerd Knippschild, Wehr; Hubert Schuster, Karsau-Beuggen, all of Germany

[73] Assignee: Deutsche Gold- und Silber-Scheideanstalt vormals Roessler, Frankfurt, Germany

[21] Appl. No.: 837,220

[22] Filed: Sep. 27, 1977

[30] Foreign Application Priority Data

Sep. 30, 1976 [DE] Fed. Rep. of Germany ....... 2644147

[51] Int. Cl.² ............................................. C01B 15/10
[52] U.S. Cl. ................................................. 423/415 P
[58] Field of Search ............................. 423/415, 415 P

[56] References Cited

U.S. PATENT DOCUMENTS

2,541,733  2/1951  Young .............................. 423/415 P

FOREIGN PATENT DOCUMENTS

549,841  12/1942  United Kingdom ................. 423/415 P
568,754   4/1945  United Kingdom ................. 423/415 P

*Primary Examiner*—Earl C. Thomas
*Attorney, Agent, or Firm*—Cushman, Darby & Cushman

[57] ABSTRACT

A compact, abrasion resistant sodium percarbonate is produced by reacting sodium carbonate with hydrogen peroxide. There is employed a solution saturated in sodium percarbonate and also containing (1) sufficient sodium carbonate that there is present sodium carbonate decahydrate as a solid phase, (2) sodium chloride in an amount of 100 to 200 grams per liter, (3) an active oxygen stabilizer and (4) sodium hexametaphosphate in an amount of 0.1 to 1.9 grams per liter. There is added hydrogen peroxide in an amount about equivalent to the dissolved sodium carbonate which results in a supersaturated solution of sodium percarbonate. The supersaturation is broken down by precipitation of sodium percarbonate during the addition of the hydrogen peroxide and up to 60 minutes thereafter. The entire process is carried out at a substantially constant temperature within the range of 10° to 20° C. The precipitated sodium percarbonate is separated and dried and the mother liquor can be returned to the first step of the process.

8 Claims, 1 Drawing Figure

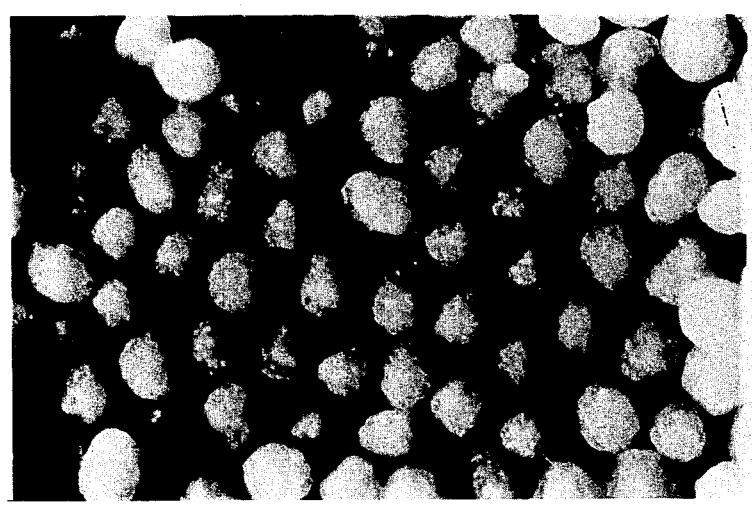

PROCESS FOR THE PRODUCTION OF COMPACT, COARSE SODIUM PERCARBONATE

BACKGROUND OF THE INVENTION

It is known to produce sodium percarbonate by reaction of a soda solution or suspension with aqueous hydrogen peroxide according to the formula

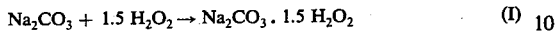

$$Na_2CO_3 + 1.5\ H_2O_2 \rightarrow Na_2CO_3 \cdot 1.5\ H_2O_2 \qquad (I)$$

and thereby reduce the solubility of the percarbonate formed by the addition of inert salts, such as sodium chloride (Swiss Pat. No. 90295).

In British Pat. No. 568,754 there is described the continuous production of sodium percarbonate from hydrogen peroxide and sodium carbonate in which the necessary amounts of hydrogen peroxide and sodium carbonate are only added in small portions to the reaction solution. Simultaneously, the use of active oxygen stabilizers such as magnesium compounds is recommended and the particle structure of the percarbonate is favorably influenced by the addition of sodium hexametaphosphate.

The disadvantage of the process is, as stated, that the addition of soda and hydrogen peroxide is only carried out in small portions and reaction times are provided between the additions. During the feeding of the materials the temperature increases from 15° to 22° C and is held at this temperature until the end of the reaction. This process leads to a fine, granular, free flowing percarbonate.

Furthermore, according to German OS No. 2 328 803 there is obtained an abrasion resistant coarse percarbonate by reaction of a soda solution or suspension which contains 2–8 grams of sodium hexametaphosphate per liter of solution with a hydrogen peroxide solution containing 3–10 grams of magnesium ions per liter of solution, in a given case in the presence of sodium chloride.

Great importance is placed on the exact observance of the amounts of sodium hexametaphosphate and magnesium ions added. Otherwise there are formed fine or non-resistant particles.

The disadvantage of the process which is only carried out discontinously is that in the reuse of the mother liquor the yield of hydrogen peroxide is greatly reduced at the high soda dissolving temperature of 24° C because of active oxygen decomposition. This decomposition is further increased in using industrial soda because of the concentrating of impurities in the mother liquor.

Because of this decomposition of active oxygen which continues during the feeding of the hydrogen peroxide the sodium percarbonate crystallization conditions cannot be held constant.

The ratio soda/sodium percarbonate is displaced to favor the soda, which as the most readily soluble component exerts an additional pressure on the sodium percarbonate still present in the solution. The net result is a too quick crystallization, a fine particle product is obtained.

It was shown, that no sodium percarbonate could be precipitated when at a constant temperature between 10° and 20° C for solving soda, based on one liter of solution, an amount of NaCl of 150 – 250 grams, an amount of undissolved soda of at least 10 to maximal 60 grams and an amount of 2 grams of sodium hexametaphosphate were used and this solution reacted with hydrogen peroxide in an amount about equivalent to the dissolved and undissolved soda at a constant temperature for reaction and crystallization.

The known process is not practicable for temperatures between 10 to 20° C.

In contrast, the object of the invention is the production of a compact, coarse sodium percarbonate with small active oxygen loss while holding the crystallization conditions as constant as possible with reuse of the mother liquor.

SUMMARY OF THE INVENTION

It has now been found that this object can be attained in the reaction of sodium carbonate with hydrogen peroxide by starting from a solution containing carbonate and saturated with sodium percarbonate, which solution also contains 100 to 200 grams per liter of sodium chloride, a known active oxygen stabilizer and sodium hexametaphosphate at 10° to 20° C if there is dissolved in such solution calcined soda in such an amount that sodium carbonate decahydrate forms as the solid phase and before the addition of the calcined soda sodium hexametaphosphate per liter is dissolved in such an amount that the total amount of sodium hexametaphosphate is 0.1 to 1.9 grams per liter of solution. The thus produced starting solution — in a given case freed from the solid phase—is treated with an amount of hydrogen peroxide which is about equivalent to the sodium carbonate dissolved in the starting solution. There is maintained about the same temperature during the entire precipitation process. During the addition of the hydrogen peroxide and for a time up to 60 minutes after this addition the supersaturation of dissolved sodium percarbonate formed is reduced by precipitation of the sodium percarbonate, the precipitated sodium percarbonate obtained separated by known process and dried and the resultant mother liquor in a given case again returned to the operating step for the soda addition solution.

Under the term "calcined soda" there is included both pure soda and also industrial soda.

By the formation of sodium carbonate decahydrate in the added soda solution this solution is simultaneously concentrated.

In order to hold the active oxygen loss as small as possible the process is not carried out at temperatures above 20° C. Preferably the temperature is 14° to 16° C.

It has been found that the degree of supersaturation of the percarbonate formed depends on the amount of sodium hexametaphosphate used and this amount in turn, if a still reducible supersaturation is formed and a compact particle is to be obtained, depends on the precipitation temperature.

Specific precipitation temperatures require the insertion of specific amounts of sodium hexametaphosphate to saturated sodium carbonate solution, thus below 20° C for the amounts given in the description of the invention. Above 20° C the active oxygen loss begins to become too large. Larger amounts as 2 grams of sodium hexametaphosphate per liter of solution, which can be employed at temperatures above 20° C cannot be used at 20° C and below.

The reason for this is that a too stable supersaturation of the forming sodium percarbonate is built up by the excessive amount of sodium hexametaphosphate, which supersaturation either does not break down at all or, in the presence of a solid phase of sodium carbonate decahydrate, increasingly is broken down by the solution pressure of the subsequently dissolving soda spontaneously in the form of small seeds. In this way very compact percarbonate would not be obtained with the smallest possible losses of active oxygen.

To avoid active oxygen losses the entire precipitation process is carried out below 20° C at about the same temperature, i.e., at ±1° C in reference to the temperature chosen.

Preferred amounts of sodium hexametaphosphate are 0.5–1.5 grams per liter of soda addition solution. Before adding hydrogen peroxide it is preferred in many cases to remove the solids phase from the soda solution, e.g., by filtration and/or decantation.

The amounts of hydrogen peroxide to be added should, as stated, be about equivalent to the amounts of sodium carbonate present, see formula (I). Under "about equivalent" is meant a ratio of active oxygen to sodium of 0.6 to 9:1.

As hydrogen peroxide solutions there are particularly suited 70 weight % aqueous solutions, however, there can be used also commercial higher percentage aqueous hydrogen peroxide solutions, e.g., up to 90%. Also less concentrated solutions than 70 weight % are capable of being added, e.g., as low as 60%. Of course, with lower concentration of hydrogen peroxide more water is let into the system, through which on the one hand the crystallization pressure for percarbonate is lowered and on the other hand the excess of mother liquor increases.

In the process there are added the customary active oxygen stabilizers such as magnesium salts, alkali salts, preferably magnesium sulfate and water glass (sodium silicate). Other stabilizers include for example magnesium silicate, magnesium chloride. The stabilizer can be used for example in an amount of 3 to 8 grams of $MgSO_4 \cdot 7 H_2O$/liter.

The stabilizer can be added to the soda addition but preferably is added to the aqueous hydrogen peroxide solution. The stabilizer serves exclusively to stabilize the final product and to purify the soda addition solution which is saturated with basic magnesium carbonate and magnesium silicate.

At the beginning of the process of the invention the mother liquor, consisting of, based on one liter of solution, 40–100 grams of sodium percarbonate, 0.1 to 1.9 grams of sodium hexametaphosphate, 100 to 200 grams of sodium chloride and which is saturated in basic magnesium carbonate and magnesium silicate is produced synthetically. This synthetic mother liquor serves for the production of the addition solution saturated with sodium carbonate. This addition solution can also be produced with the mother liquor resulting after the separation of the sodium percarbonate formed, which likewise contains 40–100 grams of sodium percarbonate per liter. Of course, this mother liquor must still be brought to the concentrations given in the description of the invention for sodium hexametaphosphate and in a given case sodium chloride.

In a given case it is favorable in using water glass and reuse of the mother liquor saturated in sodium percarbonate which still contains a part of the stabilizers of the previous charge to make up the necessary amount of water glass before addition of the calcined soda, since then the impurities in the mother liquor are adsorbed by precipitation of magnesium silicate. During the addition of calcined soda basic magnesium carbonate precipitates out, which together with magnesium silicate adsorbs the impurities from the industrial soda. Thereby, there is likewise reduced the loss of active oxygen.

Simultaneously, the magnesium concentration is reduced; the soda containing addition solution is saturated in magnesium silicate and basic magnesium carbonate. The magnesium concentration therefore only varies a trifling amount in this solution.

The increase and decrease of the supersaturation takes place with stirring. It is known that the speed of formation of seeds is dependent upon the speed of stirring. With quicker stirring there is a too quick reduction of the supersaturation and a too fine product precipitates out. With too slow stirring on the contrary the breakdown is incomplete. If the mother liquor from such a charge is used in the preparation of a soda addition solution, then sodium percarbonate crystallizes out during the production of this addition solution since the more readily soluble soda forces the more difficulty soluble sodium percarbonate out of the solution. This sodium percarbonate then precipitates together with the impurities and the magnesium compounds and is lost.

In order to establish optimum stirring speed directly after addition of the hydrogen peroxide the amount of supersaturation of the sodium percarbonate present is ascertained and its breakdown determined.

The stirring speed selected is lastly established by the sodium percarbonate quality obtained, i.e., the coarse, compact particle. If the reduction of the supersaturation is too quick then the stirring speed must be lowered and conversely if the reduction in supersaturation is too slow the stirring speed must be increased until the desired breakdown speed has been established.

The same is true for the speed of dosaging the hydrogen peroxide solution into the soda solution. This dosaging speed can be established for the operation in laboratory experiments. Optimum dosage speeds are 10–20 minutes for the amounts required for the reaction.

The precipitating sodium percarbonate is filtered off and dried in known manner. The process can be carried out without modification in customary plants for the production of sodium perborate.

The industrial advantage of the process is in the reuse of the mother liquor at substantial constancy of the precipitation parameters such as the composition of the soda addition solution, an about constant degree of impurities and temperature. As a result after each reaction there is obtained a qualitative unity, i.e., large, compact product.

The process can comprise, consist essentially of or consist of the steps set forth with the materials described.

DESCRIPTION OF THE DRAWINGS

The single FIGURE of the drawings is a slanted light photographic enlargement (25 times) of the product produced in Example 2.

DESCRIPTION OF THE PREFERRED EMBODIMENTS

The invention is further explained in the following examples.

In the Examples, the following abbreviations are used:

NaPc = sodium percarbonate
Hexa = sodium hexametaphosphate
ML = mother liquor
Oa = active oxygen
g-At/l = gram atoms/l

EXAMPLES

1. Production of the Soda Containing Addition Solution 1.35 grams of Hexa were first dissolved in 1 liter of NaPc spent liquor at 15° C which contains 200 grams NaCl, 72.2 grams $Na_2CO_3$. 1.5 $H_2O_2$, 4.5 grams $MgSO_4 \cdot 7H_2O$ and 0.15 gram sodium hexametaphosphate. At constant temperature and with stirring there were dosed into the above spent liquor within 15 minutes via an AEG-trough 150 grams of technical soda (88%). The insoluble constituents were removed by filtration and a clear soda containing insert solution obtained having the following analytical data:

Oa (active oxygen) = 0.69 g-At/l
Na (total sodium) = 2.80 g-At/l
Oa/Na - proportions = 0.24

2. Reaction of the Filtered Soda Containing Addition Solution With About 70% $H_2O_2$ 1 liter of the addition solution prepared according to Example 1 was present in a glass container (diameter = 13.5 cm, height = 21 cm) with stirring (stirrer propeller diameter: 5 cm, stirring speed = 500 rpm) and a temperature of 15° C was established by coil cooling.

Inside 15 minutes at constant temperature (15° C) there were dosed in 74.6 ml of $H_2O_2$ solution (24.5 moles/l) which contained 57.6 grams $MgSO_4 \cdot 7H_2O$ and 72.7 grams NaCl per liter.

After addition of the $H_2O_2$ solution there were found in solution 142 grams of sodium percarbonate/l, which was reduced within 50 minutes to 87 grams/l.

|  | Post Reaction Time minutes | Liquor Analysis | | | |
|---|---|---|---|---|---|
|  |  | Na gAt/l | Oa gAt/l | Ratio Oa/Na | NaPc dissolved g/l |
| After $H_2O_2$ addition | 0 | 1.81 | 1.85 | 1.02 | 142.0 |
|  | 10 | 1.70 | 1.77 | 1.04 | 133.5 |
|  | 20 | 1.63 | 1.53 | 1.06 | 120.0 |
|  | 30 | 1.27 | 1.40 | 1.10 | 99.6 |
|  | 40 | 1.21 | 1.00 | 1.21 | 95.0 |
|  | 50 | 0.88 | 1.11 | 1.26 | 87.1 |

The salt magma was filtered over a suction filter and air dried.

There was obtained a coarse, compact sodium percarbonate with the following analytical values:
Active oxygen : 14.26%
Bulk density : 825 g/l Sieve Analysis
on 0.8 mm : 9%
on 0.5 mm : 36%
on 0.4 mm : 11%
on 0.2 mm : 43%
on 0.1 mm : 1%
Residue : 0%

The appearance of the particles is shown in the drawing, which is a slanted light photographic enlargement (25 times).

2.1 Working Test 1 meter³ of the addition solution produced according to Example 1 was present in a V4A-steel container (diameter = 1530 mm, height = 1420 mm) with stirring (stirrer propeller diameter = 500 mm, stirring speed = 200 rpm) and with the aid of coil cooling temperature of 15° C established.

Within 14 minutes at constant temperature (15° C) there were fed in via a Rotameter 75 liters of $H_2O_2$ solution (24.5 moles/l) which contained 57.6 grams $MgSO_4 \cdot 7H_2O$ and 72.7 grams NaCl per liter.

After addition of the $H_2O_2$ solution there were found in solution 126.4 grams NaPc/l. which within 30 minutes was reduced to 78.5 grams/l.

|  | Post Reaction Time minutes | Liquor Analysis | | | |
|---|---|---|---|---|---|
|  |  | Na gAt-1 | Oa gAt-1 | Ratio Oa/Na | NaPc dissolved g/l |
| After $H_2O_2$ addition | 0 | 1.61 | 1.41 | 0.88 | 126.4 |
|  | 10 | 1.41 | 1.17 | 0.83 | 110.7 |
|  | 20 | 1.15 | 0.96 | 0.83 | 90.2 |
|  | 30 | 1.00 | 0.84 | 0.84 | 78.5 |

The salt magma was separated from the mother liquor by a centrifuge, the salt dried in a fluidized bed drier.

Active oxygen : 14.02%
Bulk density : 1007 grams/l

Sieve analysis
on 0.8 mm : 0%
on 0.5 mm : 30%
on 0.4 mm : 18%
on 0.2 mm : 35%
on 0.1 mm : 16%
Residue : 1%

2.2 Working Test 1 m³ of a NaPc mother liquor with a temperature of 15° C which containes 200 grams NaCl; 72.2 grams $Na_2CO_3$ 1.5 $H_2O_2$; 4.5 grams $MgSO_4 \cdot 7 H_2O$ and 0.15 grams Hexa is present in a V4A-steel container (diameter = 1530 mm, height = 1420 mm) with stirring (stirrer propeller diameter = 500 mm, stirring speed = 220 rpm).

In this mother liquor are dissolved 1.35 kilograms of Hexa. Then, within 25 minutes at constant temperature (15° C) and stirring there were dosed into the above solution via an AEG-trough 105 kilograms of technical soda (96%). Immediately after addition of soda there were dosed via a Rotameter and within 15 minutes and a temperature of 15° C 76 liters of an aqueous hydrogen peroxide solution (23.7 Mol/l) which contained 52.6 grams $MgSO_4 \cdot 7 H_2O$ and 65.8 grams NaCl. After addition of this hydrogen peroxide solution there were found in solution 142 grams NaPc per liter, which within 45 minutes were reduced to 71.4 grams/l.

|  | Post Reaction Time minutes | Liquor Analysis | | | |
|---|---|---|---|---|---|
|  |  | Na gA/l | Oa gAt/l | Ratio Oa/Na | NaPc dissolved g/l |
| After $H_2O_2$ addition | 0 | 1.81 | 1.43 | 0.79 | 142.0 |
|  | 45 | 0.91 | 0.79 | 0.87 | 71.4 |

The salt magma was separated from the mother liquor by a continuously working centrifuge; the salt dried in a fluidized bed drier. There was abtained 150 kilograms of product with the following analytical valus:
Oa : 13.94%
Bulk density : 941 grams/l Sieve analysis
on 0.8 mm : 6%
on 0.5 mm : 29%
on 0.4 mm : 15%
on 0.2 mm : 38% on 0.1 mm : 12%
Residue : 9%

3. Dependency of the Supersaturation of the Sodium Hexametaphosphate Concentration A soda solution was reacted according to Example 2 in which there were dissolved different amounts of hexametaphosphate. It was found that with increasing hexa concentration after addition of the $H_2O_2$ solution the supersaturation also increased. In the region investigated between 1 gram and 1.75 grams of sodium hexametaphosphate there was a nearly linear proportionality.

| Soda Containing Addition Solution | | | NaPc Content (Dissolved) | | |
|---|---|---|---|---|---|
| | | | After $H_2O_2$ | Post Reaction Time After | |
| Hexa g/l | Na g-At/l | Oa g-At/l | Addition g/l | 20 min. g/l | 50 min. g/l |
| 1.00 | 2.79 | 0.63 | 100 | 65.9 | — |
| 1.25 | 2.90 | 0.67 | 123 | — | 56.5 |
| 1.50 | 2.80 | 0.69 | 142 | 120.0 | 87.1 |
| 1.75 | 2.86 | 0.69 | 157 | 130.3 | — |

4. Reuse of the NaPc Mother Liquor 4.1 Production of the Soda Containing Addition Solution 1.8 grams of sodium hexametaphosphate were dissolved in 1.5 liters of NaPc spent liquor at 15° C which contained 300 grams NaCl, 78 grams technical soda (88%), 33.0 grams $H_2O_2$ (100%) and 6.75 grams $MgSO_4 \cdot 7H_2O$. After addition of 3 ml of water glass (1.5 ml water glass 38° Baume and 1.5 ml water) there were fed in within 25 minutes via an AEG-trough 225 grams of technical soda (88%). Approximately 1000 ml of soda containing addition solution were decanted after a sedimentation time of 10 minutes, treated with 3 grams of filter aid and filtered.

Analysis of the Addition Solution:
Oa = 0.54 g-At/l
Na = 2.88 g-At/l
Oa/Na = 0.19

Analysis of the Filter Residue:
Total amount: 22 grams
Of which :
  5.8 grams are soda
  1.3 grams are NaPc 4.2 Reaction of Filtered Soda Containing Addition Solution With About 70% $H_2O_2$ 1 liter of addition solution (according to 4.1) was present in a glass container as described in Example 2 with stirring (stirrer propeller diameter: 5 cm, stirring speed = 500 rpm) and a temperature of 15° C established by coil cooling. Within 13 minutes there were fed in at constant temperature 66.1 ml $H_2O_2$ (24.5 moles/l) which contained 57.6 grams $MgSO_4 \cdot 7H_2O$ and 72.7 grams NaCl per liter.

| Liquor Analysis | Na g-At/l | Oa g-At/l | Oa/Na Ratio |
|---|---|---|---|
| After $H_2O_2$ Addition | 1.66 | 1.27 | 0.76 |
| After 45 minutes Post Reaction Time | 0.93 | 0.68 | 0.73 |

The salt was separated via a suction filter and air dried.

Salt Analysis

Amount of Salt : 145 grams
Oa : 14.16%
Bulk density : 810 grams/l

Sieve Analysis on 0.8 mm : 1%
on 0.5 mm : 50%
on 0.4 mm : 13%
on 0.2 mm : 36%
on 0.1 mm : 0%
Residue : 0%

4.3 Return of the Mother Liquor and Production of the Soda Containing Addition Solution There were dissolved 1.2 grams of Hexa in 1 liter of waste liquor from Example 4.2 and this solution was then mixed with the unreacted soda containing addition solution and the sedimented solids portion of Experiment 4.1.

After addition of 2 ml of water glass (1 ml water glass 38° Baume + 1 ml water) there were fed in within 18 minutes 150 grams of technical soda (88%) at 15° C.

Approximately 1000 ml of soda containing addition solution were decanted after a sedimentation time of 10 minutes, treated with 1 ml of filter aid and filtered.

Analysis of the Addition Solution:
Oa = 0.52 g-At/l
Na = 2.92 g-At/l
Oa/Na = 0.17

Analysis of the Filter Residue:
Total amount: 26 grams
Of which :
  7.7 grams are soda
  1.8 grams are NaPc 4.4 Reaction of the Filtered Soda Containing Addition Solution with $H_2O_2$ 1 liter of the previously produced addition solution was present as already described.

Inside 12 minutes there were fed in 70.6 ml of $H_2O_2$ (24.5 moles/l) which contained 57.6 grams $MgSO_4 \cdot 7H_2O$ and 72.7 grams NaCl per liter.

| Liquor Analysis | Na g-At/l | Oa g-At/l | Oa/ Na Ratio |
|---|---|---|---|
| After $H_2O_2$ Addition | 1.56 | 1.20 | 0.77 |
| After 45 minutes Post Reaction Time | 0.94 | 0.72 | 0.77 |

The salt was separated off via a suction filter and air dried.

Salt Analysis

Amount of Salt : 150 grams
Oa : 14.24%
Bulk density : 845 grams/l

Sieve analysis on 0.8 mm : 0%
on 0.5 mm : 25%
on 0.4 mm : 23%
on 0.2 mm : 51%
on 0.1 mm : 1%
Residue : 0%

What is claimed is:

1. A process for preparing compact, coarse abrasion resistant sodium percarbonate comprising employing a solution saturated in sodium percarbonate and also containing (1) sufficient sodium carbonate that there is present sodium carbonate decahydrate as a solid phase, (2) sodium chloride in an amount of 100 to 200 grams per liter, (3) an active oxygen stabilizer and (4) sodium hexametaphosphate in an amount of 0.1 to 1.9 grams per liter, adding hydrogen peroxide in an amount about equivalent to the sodium carbonate to thereby form a solution supersaturated in sodium percarbonate, breaking down the supersaturation during the addition of the hydrogen peroxide and for a period of time up to 60 minutes thereafter, the entire process being carried out at a substantially constant temperature between 10° and 20° C and thereafter separating the sodium percarbonate precipitated from the supersaturated solution and drying the separated sodium percarbonate.

2. The process of claim 1 including the step of returning the mother liquor left after removal of the precipitated sodium percarbonate to the operation step for the soda addition solution and for reaction with further hydrogen peroxide.

3. The process of claim 1 including the step of removing the solid phase by decanting or filtering before adding hydrogen peroxide.

4. The process of claim 2 wherein the sodium hexametaphosphate is employed in an amount of 0.5 to 1.5 grams per liter of solution.

5. The process according to claim 4 wherein the entire precipitation process is carried out at a temperature kept constant to ±1° C.

6. The process of claim 5 wherein the temperature of the process is 14° to 16° C.

7. The process of claim 1 wherein not over 1% of the sodium percarbonate formed passes through a 0.1 mm sieve.

8. The process of claim 7 wherein not over 9% of the sodium percarbonate formed is retained in a 0.8 mm sieve.

* * * * *